United States Patent
Witkop

(10) Patent No.: US 9,475,436 B2
(45) Date of Patent: Oct. 25, 2016

(54) GRILLE WINTER COVER INTERIOR TRIM ATTACHMENT

(71) Applicant: GM Global Technology Operations LLC, Detroit, MI (US)

(72) Inventor: Wayne R. Witkop, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 13/963,571

(22) Filed: Aug. 9, 2013

(65) Prior Publication Data
US 2015/0041074 A1  Feb. 12, 2015

(51) Int. Cl.
*B60R 19/52* (2006.01)
*B60R 13/08* (2006.01)

(52) U.S. Cl.
CPC ............ *B60R 13/0838* (2013.01); *B60R 19/52* (2013.01)

(58) Field of Classification Search
CPC ............... B60R 13/0838; B60R 19/52; B60J 13/0838; B60J 19/52
USPC ....... 160/327, 238, 329, 354, 368.1, 370.21, 160/DIG. 1; 150/166, 168, 901; 296/95.1; 293/115; 180/68.6
See application file for complete search history.

(56) References Cited

U.S. PATENT DOCUMENTS

| | | | | | |
|---|---|---|---|---|---|
| 1,399,859 | A | * | 12/1921 | Garver | 180/68.4 |
| 1,629,216 | A | * | 5/1927 | Klenck, Jr. | 180/68.6 |
| 1,706,447 | A | * | 3/1929 | Goodykoontz | 180/68.6 |
| 2,070,919 | A | * | 2/1937 | Posey | 160/237 |
| 2,079,327 | A | * | 5/1937 | Linn | 160/237 |
| 2,223,145 | A | * | 11/1940 | Wise | 160/329 |
| 2,614,630 | A | * | 10/1952 | Moszelt | 160/370.21 |
| 2,624,406 | A | * | 1/1953 | Szychowski et al. | 160/370.21 |
| 2,821,248 | A | * | 1/1958 | Irvine | 160/370.21 |
| 2,907,384 | A | * | 10/1959 | Spratt et al. | 160/370.21 |
| 2,979,129 | A | * | 4/1961 | Ketchum | 160/370.21 |
| 3,042,111 | A | * | 7/1962 | Wytovich | 150/168 |
| 4,085,964 | A | * | 4/1978 | Hutto et al. | 296/91 |
| 4,635,993 | A | * | 1/1987 | Hooper et al. | 296/95.1 |
| 5,042,551 | A | * | 8/1991 | Ein et al. | 160/90 |

\* cited by examiner

*Primary Examiner* — David Purol
(74) *Attorney, Agent, or Firm* — BrooksGroup

(57) ABSTRACT

A number of variations may include a grille cover which may attach to a grille.

18 Claims, 9 Drawing Sheets

GRILLE WINTER COVER INTERIOR TRIM ATTACHMENT

TECHNICAL FIELD

The field to which the disclosure generally relates to includes automobile grille covers.

BACKGROUND

A vehicle may include a grille.

SUMMARY OF ILLUSTRATIVE VARIATIONS

One variation may include a grille cover which may be attached to a grille.

Other illustrative variations will become apparent from the detailed description provided hereinafter. It should be understood that the detailed description and specific examples, while disclosing optional variations, are intended for purposes of illustration only and are not intended to limit the scope of the invention.

BRIEF DESCRIPTION OF THE DRAWINGS

Select examples of variations will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the invention, its application, or uses.

Figure 22:
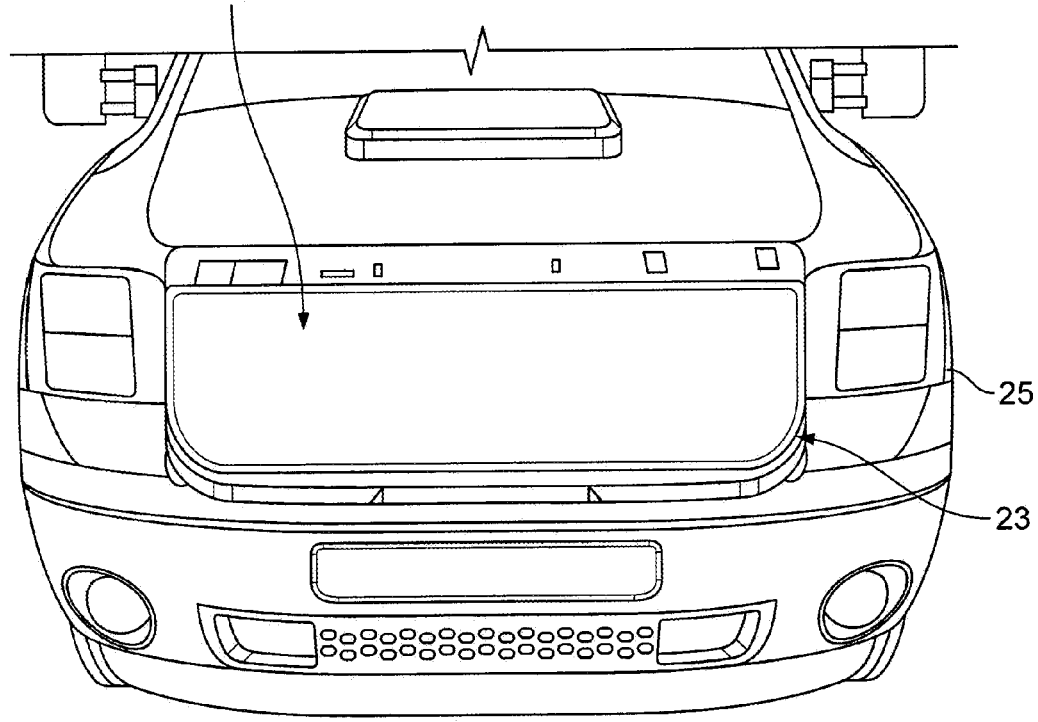
FIG. 22 illustrates a grille cover assembly attached to a grille according to a number of variations.

A grille cover assembly 21 may be configured in any of a number of variations to cover any of a number of variations of grilles 23 on any of a number of variations of vehicles 25, for example as illustrated in FIG. 22. A grille cover assembly 21 in any of a number of variations may attach to a grille 23 of a vehicle 25 at prescribed cold temperatures to decrease the time it takes to heat the interior cabin of the vehicle 25.

Figure 5:
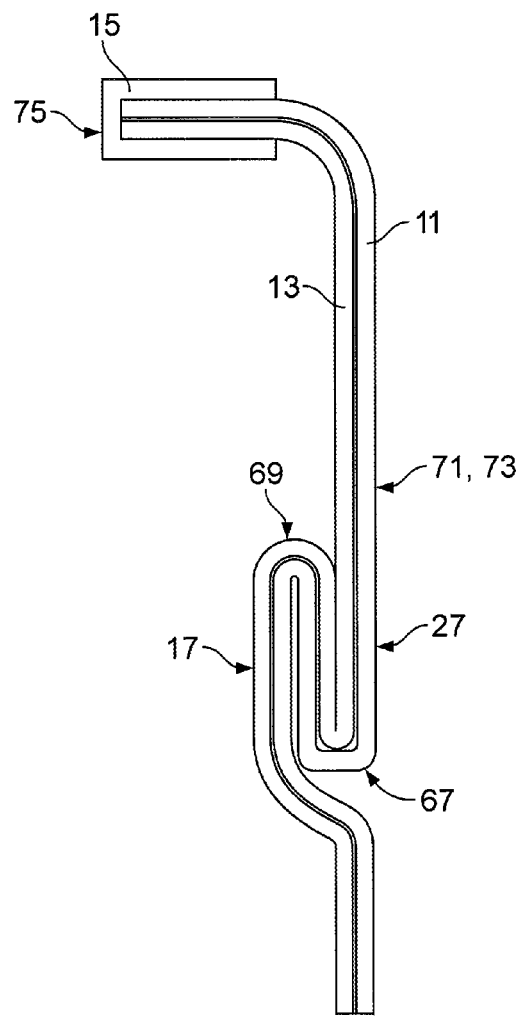
FIG. 5 illustrates a sectional view of a grille cover according to a number of variations.
Figure 6:
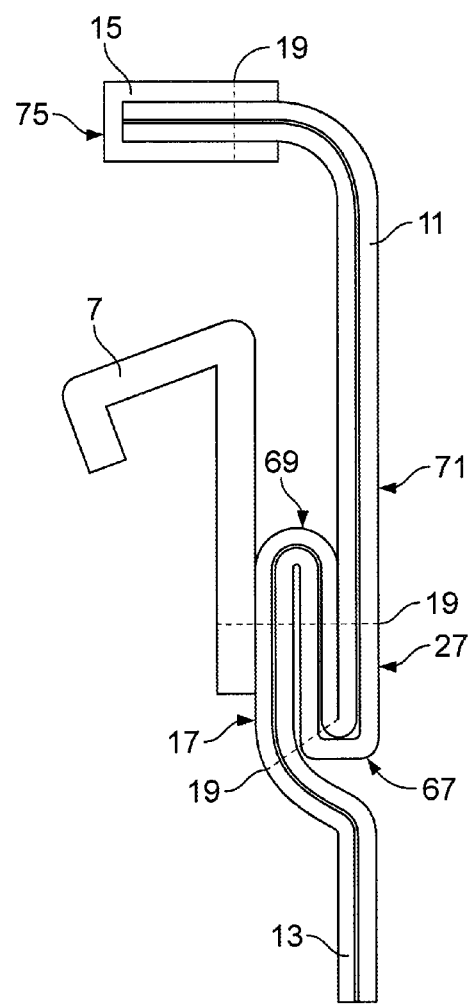
FIG. 6 illustrates a sectional view of a grille cover assembly according to a number of variations.

Referring to FIGS. 1-2 and 5-6, in one variation, a grille cover assembly 1 may include a grille cover 71. A grille cover 71 may include a water resistant layer 11 and an insulating layer 13. The water resistant layer 11 and the insulating layer 13 may comprise of any of a number of materials including, but not limited to, vinyl with a non-woven polyester backing, for example as illustrated in FIGS. 5-6. The grille cover 71 may also include a trim 15 which may help insulate the grille 23. The trim 15 may comprise any of a number of materials including, but not limited to, non-woven polyester, such as felt.

Figure 3:
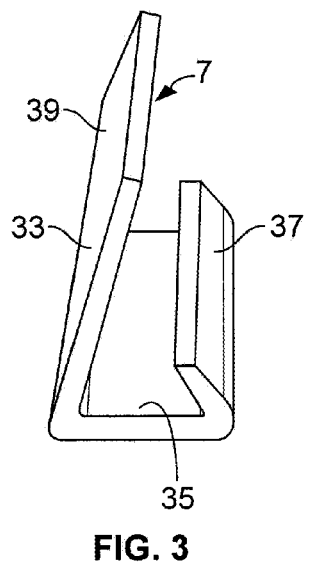
FIG. 3 illustrates a clip according to a number of variations.
Figure 4:
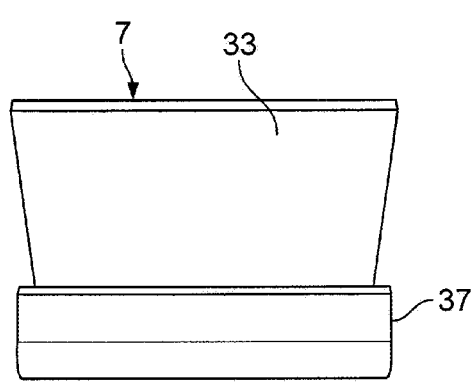
FIG. 4 illustrates a clip according to a number of variations.
Figure 15:
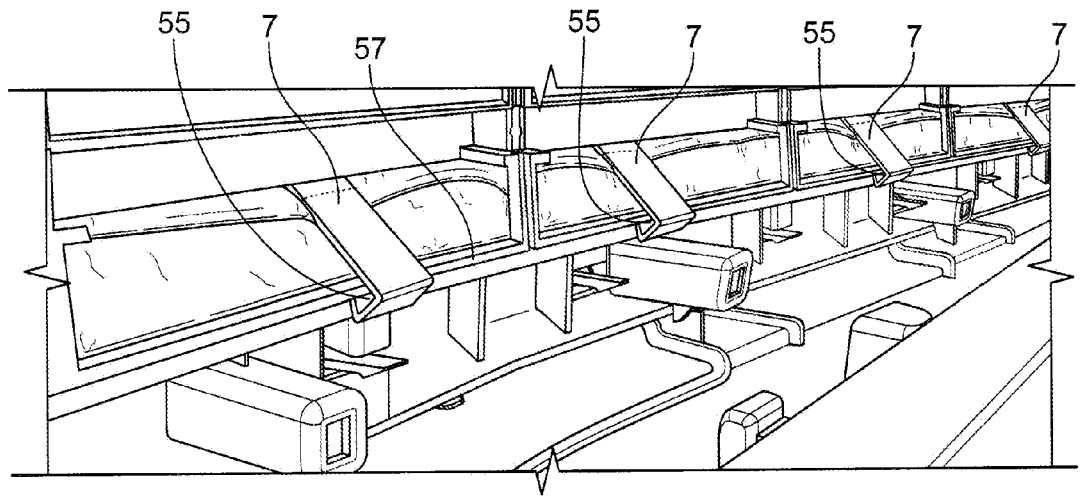
FIG. 15 illustrates a grille cover assembly attached to a grille according to a number of variations.
Figure 16:
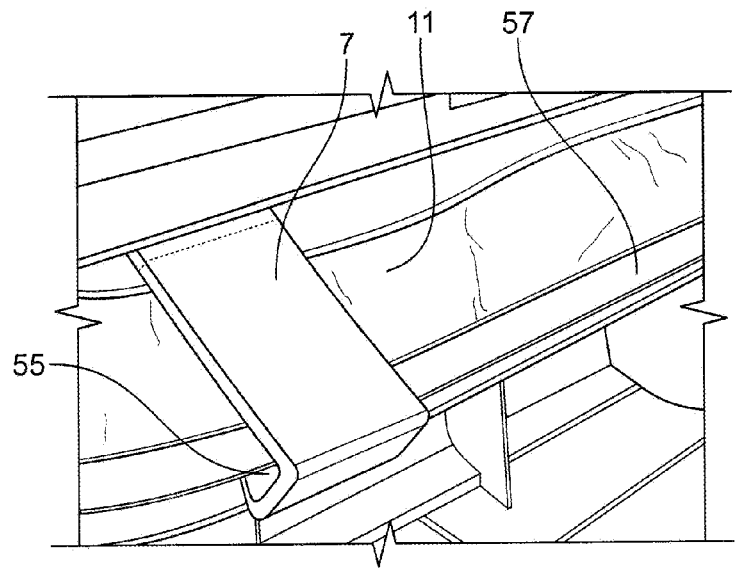
FIG. 16 illustrates a close-up of a grille cover assembly attached to a grille according to a number of variations.

Referring to FIGS. 3-4, in any of a number of variations, a grille cover assembly 1 may include a plurality of clips 7. The clip 7 may be configured in any of a number of variations to attach to a grate 57 (best seen in FIG. 15) of a grille 23. In one variation, the clip 7 may be one component which may include a rectangular flat portion 33 connected to a substantially perpendicular planar portion 35 which may include a flange 37 which is bent toward the rectangular planar portion 33, for example as illustrated in FIGS. 3-4. The clip 7 may be comprised of any of a number of materials including, but not limited to, polymeric material.

Figure 1:
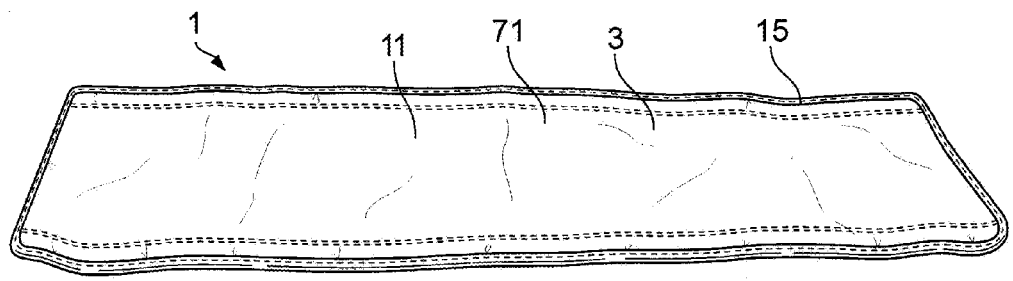
FIG. 1 illustrates a grille cover assembly according to a number of variations.
Figure 2:
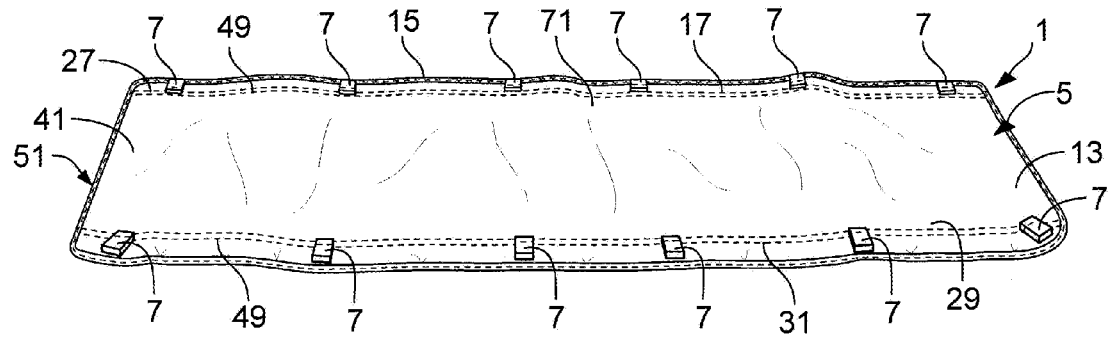
FIG. 2 illustrates a grille cover assembly according to a number of variations.
Figure 7:
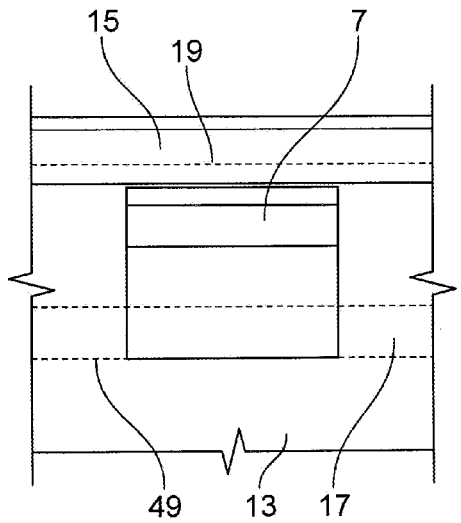
FIG. 7 illustrates a close-up of a grille cover assembly according to a number of variations.
Figure 8:
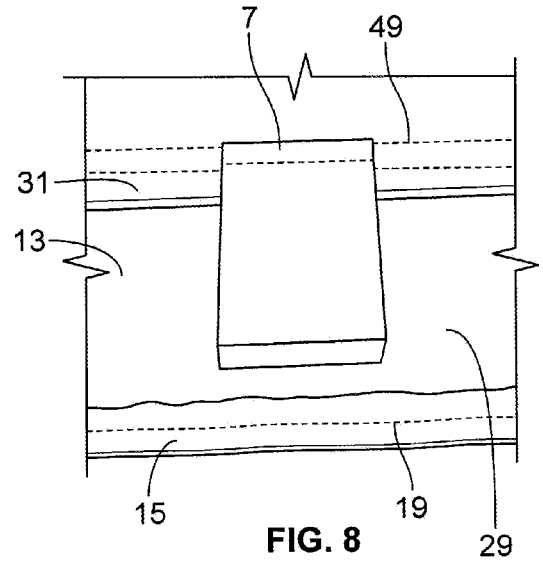
FIG. 8 illustrates a close-up of a grille cover assembly according to a number of variations.
Figure 9:
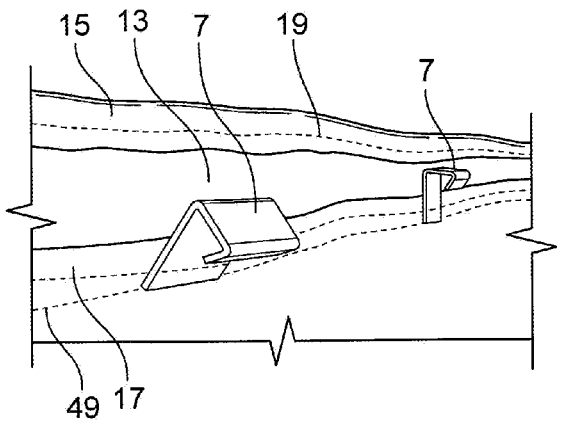
FIG. 9 illustrates a close-up of a grille cover assembly according to a number of variations.
Figure 10:
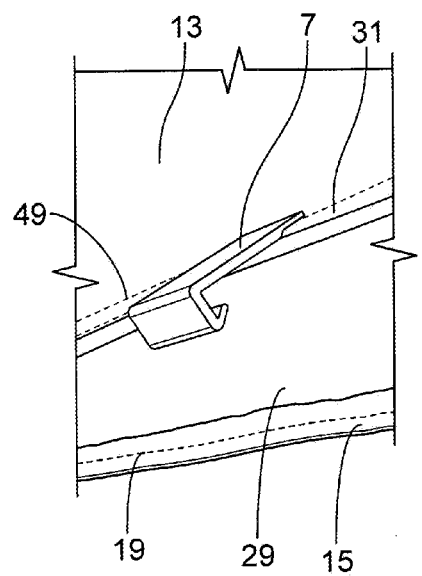
FIG. 10 illustrates a close-up of a grille cover assembly according to a number of variations.
Figure 11:
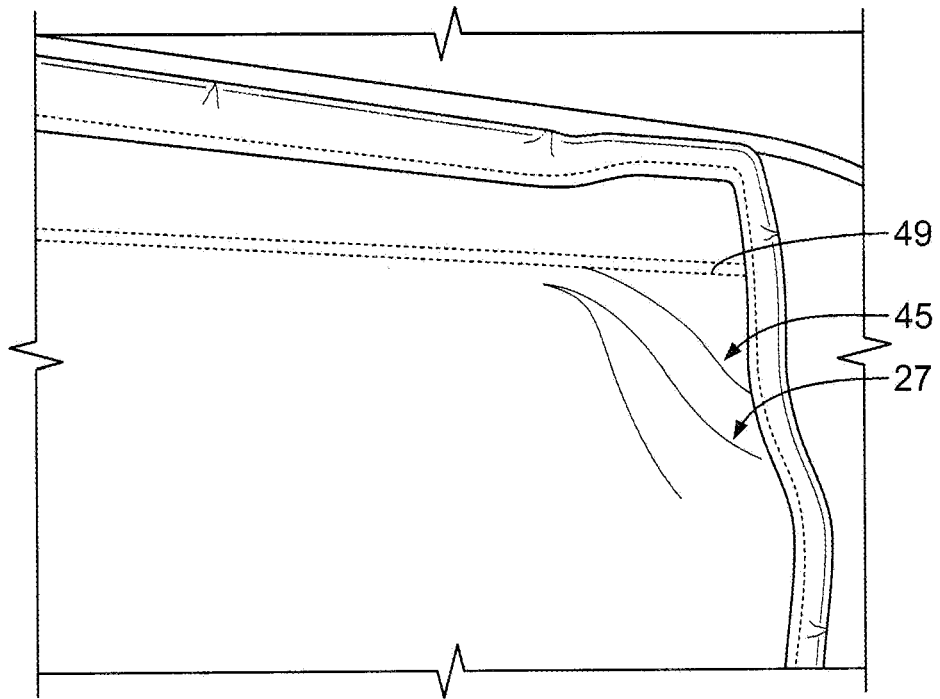
FIG. 11 illustrates a close-up of a grille cover assembly according to a number of variations.
Figure 12:
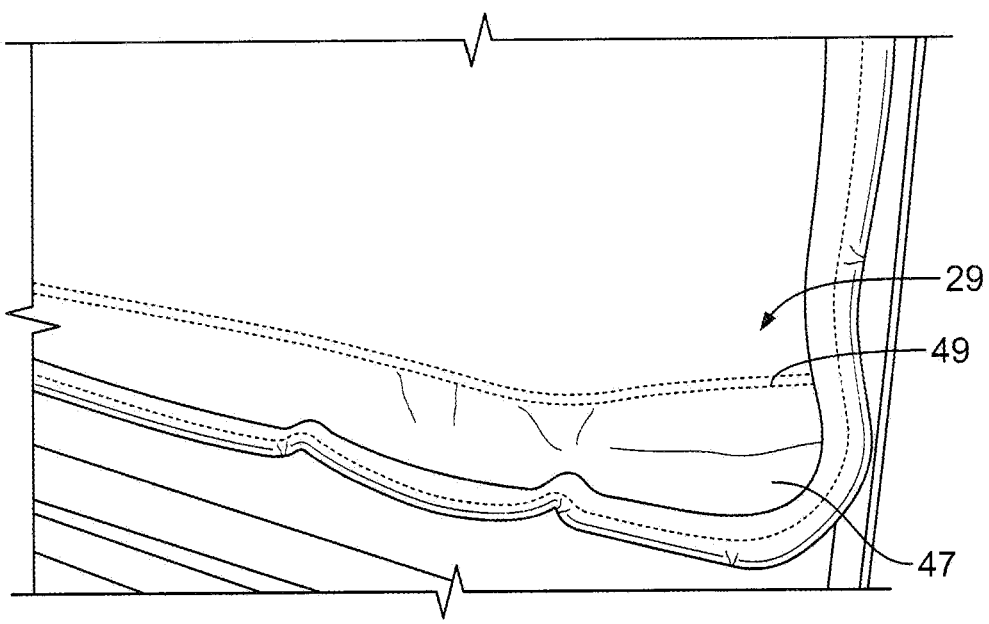
FIG. 12 illustrates a close-up of a grille cover assembly according to a number of variations.
Figure 13:
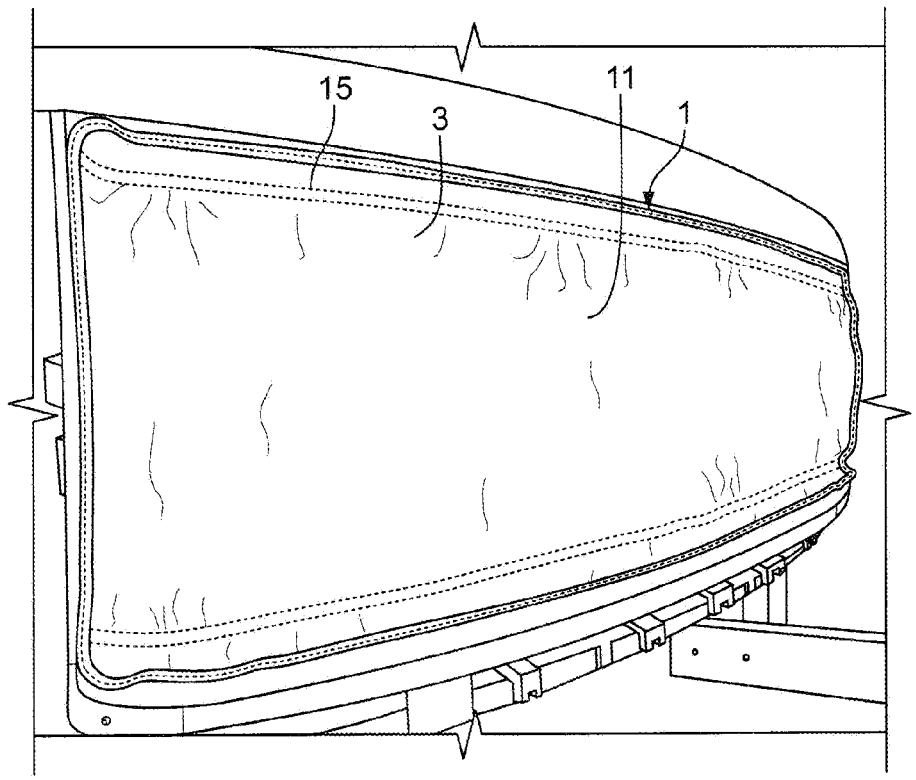
FIG. 13 illustrates a grille cover assembly according to a number of variations.
Figure 14:
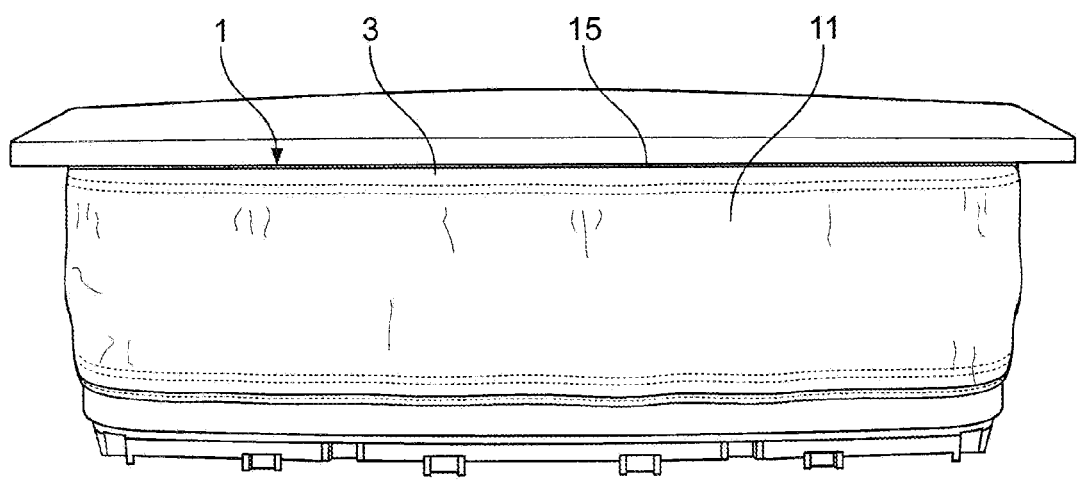
FIG. 14 illustrates a grille cover assembly according to a number of variations.

Referring to FIGS. 1-2 and 5-12, a grille cover assembly 1 may be assembled in any of a number of variations. In one variation, the upper portion of the grille cover 27 may be folded upward 67 against the insulating layer 13, for example as illustrated in FIGS. 5-6. The upper portion of the grille cover 27 may then be folded back downward 69 to create an upper hem seam 17, for example as illustrated in FIGS. 5-6. A clip 7 may be oriented on the upper hem seam 17 so that the perpendicular portion 35 may be pointing away from the insulating layer 13, and the flange 37 may be pointing downward toward the lower portion 29 of the insulating layer 13, for example as illustrated in FIGS. 6, 7, and 9. A plurality of clips 7 including, but not limited to, six clips 7 may be spaced along the upper hem seam 17, for example as illustrated in FIG. 2. The upper hem seam 17 on the top portion of the grille cover 27 and the clips 7 may be held in place in any of a number of variations including, but not limited to, stitching a double sew line 49 across the upper hem seam 17 and at least one row of the double sew line 49 across the clips 7, for example as illustrated in FIGS. 6-7, 9, and 11. The lower portion of the grille cover 29 may be folded downward toward the insulating layer 13 and then may be folded back upward to create a lower hem seam 31 along the lower portion of the grille cover 29, for example as illustrated in FIGS. 8 and 10. A plurality of clips 7 may each be oriented so that the perpendicular portion 35 is pointing away from the insulating layer 13 and the flange 37 may be pointing downward toward the insulating layer 13, for example as illustrated in FIGS. 8 and 10. A plurality of clips 7 including, but not limited to, six clips 7 may be spaced along the lower hem seam 31, for example as illustrated in FIG. 2. The lower hem seam 31 on the lower portion of the grille cover 29 and the clips 7 may be held in place in any of a number of variations including, but not limited to, stitching a double sew line 49 across the lower hem seam 31 and at least one row of the double sew line 49 across the clips 7, for example as illustrated in FIGS. 8, 10, and 12. A trim 15 may then be folded in half 75 along the perimeter of the grille cover 71, for example as illustrated in FIGS. 5-6. The trim 15 may be attached the grille cover 71 in any of a number of variations including, but not limited to, stitching a single sew line 19 through the trim material 15 and the grille cover 71, for example as illustrated in FIGS. 6 and 11-12.

Figure 17:
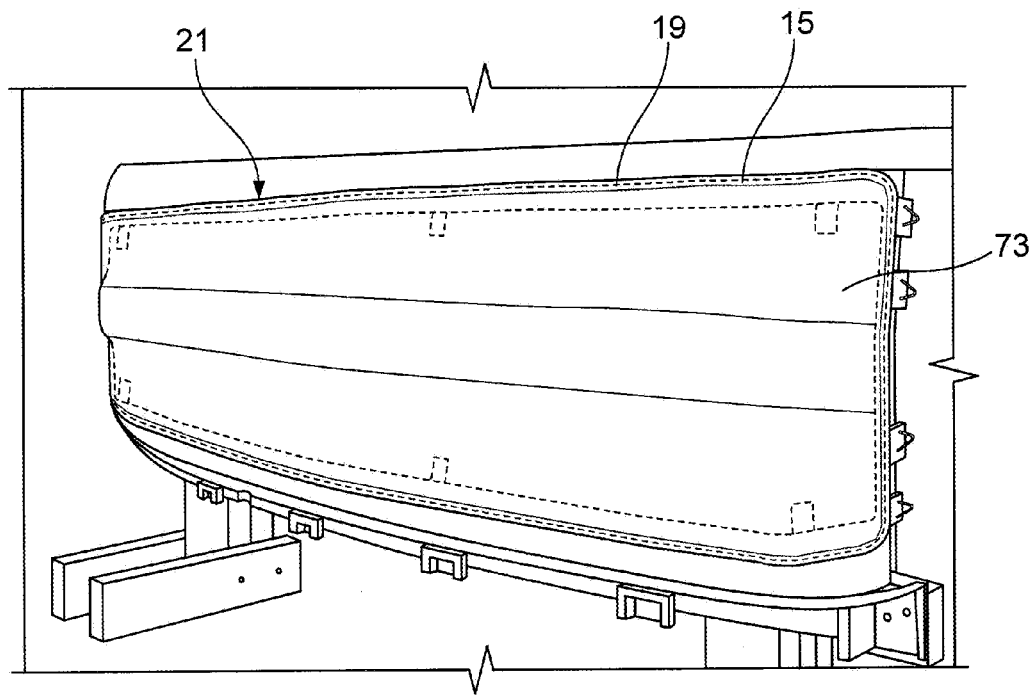
FIG. 17 illustrates a grille cover assembly according to a number of variations.
Figure 18:
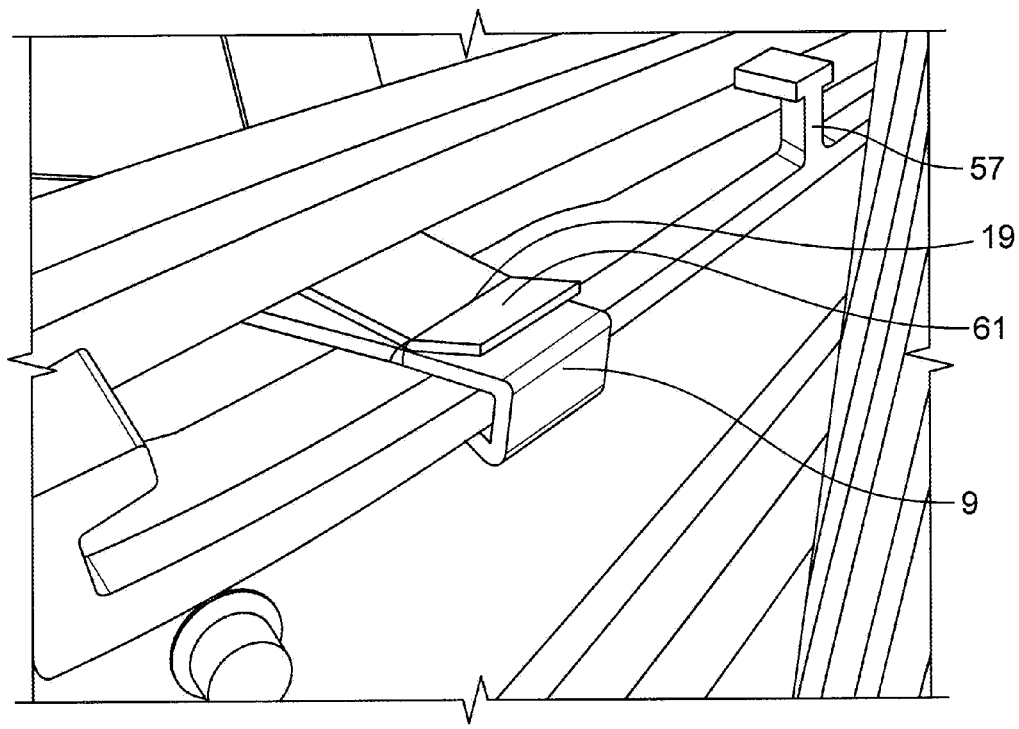
FIG. 18 illustrates a close-up of a grille cover assembly attached to a grille according to a number of variations.
Figure 19:
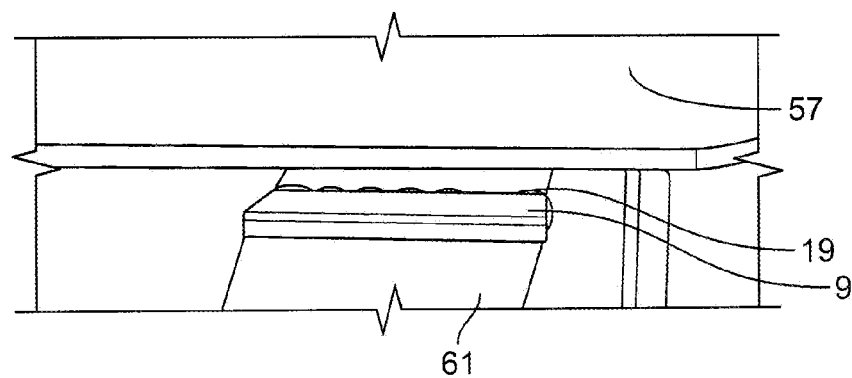
FIG. 19 illustrates a close-up of a grille cover assembly attached to a grille according to a number of variations.
Figure 20:
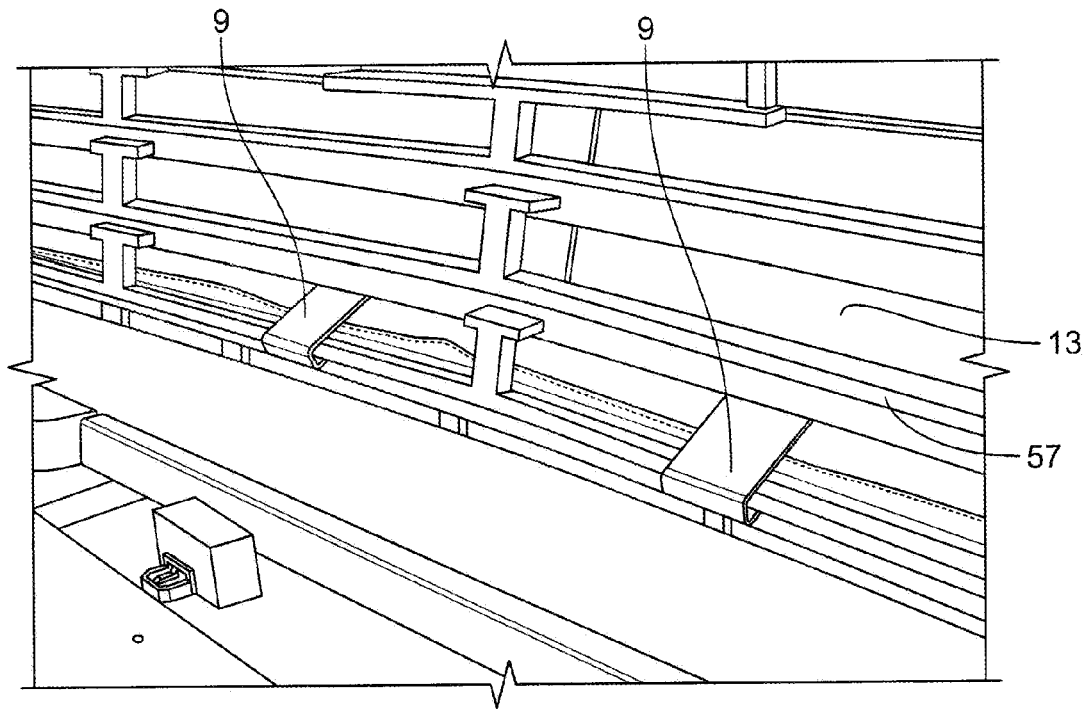
FIG. 20 illustrates a grille cover assembly attached to a grille according to a number of variations.
Figure 21:
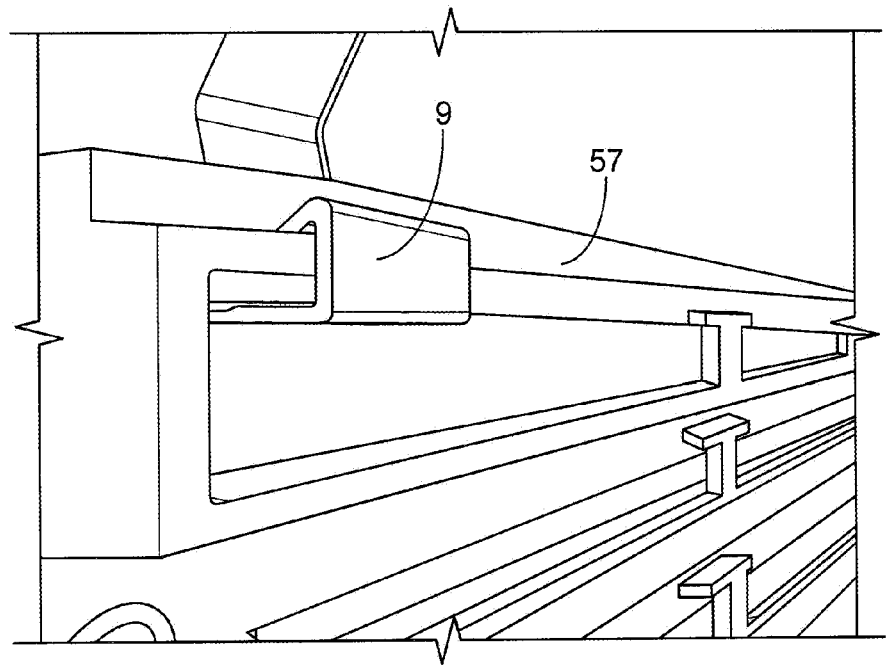
FIG. 21 illustrates a close-up of a grille cover assembly attached to a grille according to a number of variations.

Referring to FIGS. 5 and 17-19, in another variation, a plurality of clips 61 may be attached to a grille cover 73 with the use of tabs 61. The upper portion of the grille cover 27 may be folded upward 67 against the insulating layer 13, for example as illustrated in FIG. 5. The upper portion of the grille cover 27 may then be folded back downward 69 to create an upper hem seam 17, for example as illustrated in FIG. 5. A tab 61 may be oriented on the upper hem seam 17 (not shown). A tab 61 may include any of a number of materials including, but not limited to, woven material such as webbing. A plurality of tabs 61 including, but not limited to, six tabs 7 may be spaced along the upper hem seam 17. The upper hem seam 17 on the top portion of the grille cover 27 and the tabs 61 may be held in place in any of a number of variations including, but not limited to, stitching a double sew line 49 across the upper hem seam 17 and tabs 61 (not shown). The lower portion of the grille cover 29 may be folded downward toward the insulating layer 13 and then may be folded back upward to create a lower hem seam 31 along the lower portion of the grille cover 29. A plurality of tabs 61 may each be oriented on the lower hem seam 31. A plurality of tabs 61 including, but not limited to, six tabs 61 may be spaced along the lower hem seam 31. The lower hem seam 31 on the lower portion of the grille cover 29 and the tabs 61 may be held in place in any of a number of variations including, but not limited to, stitching a double sew line 49 across the lower hem seam 31 and tabs 61. A plurality of clips 9 may then be attached to each of the plurality of tabs 61 in any of a number of variations including, but not limited to, stitching a single sew line 19 across the clips 9 and the tabs 61, for example as illustrated in FIGS. 18-19. A trim 15 may then be folded in half along the perimeter of the grille cover 73. The trim 15 may be attached to the grille cover 73 in any of a number of variations including, but not limited to, stitching a single sew line 19 through the trim material 15 and the grille cover 73, for example as illustrated in FIG. 17.

In any of the above variations, one or more reinforcement strips (not shown) may be attached to the upper portion of the grille cover assembly 63 between each clip 7,9 and the lower portion of the grille cover assembly 65 between each clip 7,9.

Referring to FIGS. 13-16 and 18-22, a grille cover assembly 1, 21 may be attached to a grille 23 in any of a number of variations. In one variation, the flanges 37 on the clips 7, 9 may attach to the grill 23 by hooking to the grating 57, for example as illustrated in FIGS. 15-16 and 18-21. This may secure the grille cover assembly 1, 21 in place over the grille 23, for example as illustrated in FIGS. 13-14, 17, and 22.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a grille cover; wherein the grille cover comprises a first layer and a second layer; and a plurality of clips attached to the grille cover.

Variation 2 may include a product as set forth in Variation 1 further comprising a trim attached to a perimeter of the grille cover.

Variation 3 may include a product as set forth in any of Variations 1-2 wherein the first layer is water resistant.

Variation 4 may include a product as set forth in any of Variations 1-3 wherein the first layer comprises vinyl.

Variation 5 may include a product as set forth in any of Variations 1-4 wherein the second layer is insulative.

Variation 6 may include a product as set forth in any of Variations 1-5 wherein the second layer comprises non-woven polyester.

Variation 7 may include a product as set forth in any of Variations 1-6 wherein the trim is attached to the perimeter of the grille cover via sewing.

Variation 8 may include a product as set forth in any of Variations 1-7 wherein the trim comprises an insulating material.

Variation 9 may include a product as set forth in any of Variations 1-8 wherein the trim comprises felt.

Variation 10 may include a product as set forth in any of Variations 1-9 wherein the plurality of clips comprise a polymeric material.

Variation 11 may include a product as set forth in any of Variations 1-10 wherein the plurality of clips are configured to attach to a grate of a grille.

Variation 12 may include a product as set forth in any of Variations 1-11 wherein the plurality of clips are attached directly to the grille cover.

Variation 13 may include a product as set forth in any of Variations 1-12 wherein the plurality of clips are attached directly to the grille cover via sewing.

Variation 14 may include a product as set forth in any of Variations 1-13 wherein the grille cover has at least one hem seam.

Variation 15 may include a product as set forth in any of Variations 1-14 wherein the plurality of clips are attached to the hem seam.

Variation 16 may include a product as set forth in any of Variations 1-15 wherein the plurality of clips are attached to the hem seam via sewing.

Variation 17 may include a product as set forth in any of Variations 1-14 wherein a plurality of tabs are attached to the hem seam.

Variation 18 may include a product as set forth in any of Variations 1-14, and 17 wherein the plurality of tabs are attached to a plurality of clips.

Variation 19 may include a product as set forth in any of Variations 1-14 and 17-18 wherein the plurality of tabs are attached to the plurality of clips via sewing.

Variation 20 may include a product as set forth in any of Variations 1-19 wherein a reinforcement strip is attached between the plurality of clips.

The above description of variations within the scope of the invention is merely illustrative in nature and, thus, variations or variants thereof are not to be regarded as a departure from the spirit and scope of the invention.

What is claimed is:

1. A product comprising:
a grille cover comprising a front face, rear face, a top edge, a bottom edge, a first side edge, a second side edge, and a plurality of clips, wherein the plurality of clips are arranged along the top edge and the bottom edge of the grille cover, and wherein each of the plurality of clips comprise a first planar portion which is substantially perpendicular to a second planar portion, and a flange which extends upward from the second planar portion and which is bent at an angle toward the first planar portion, wherein the second planar portion and the flange are constructed and arranged to hook onto a grate of a grille; and wherein the grille cover includes a first layer and a second layer.

2. The product of claim 1 further comprising a trim attached to a perimeter of the grille cover.

3. The product of claim 1 wherein the first layer is water resistant.

4. The product of claim 1 wherein the first layer comprises vinyl.

5. The product of claim 1 wherein the second layer is insulative.

6. The product of claim 1 wherein the second layer comprises non-woven polyester.

7. The product of claim 2 wherein the trim is attached to the perimeter of the grille cover via sewing.

8. The product of claim 2 wherein the trim comprises an insulating material.

9. The product of claim 2 wherein the trim comprises felt.

10. The product of claim 1 wherein the plurality of clips comprise a polymeric material.

11. The product of claim 1 wherein the plurality of clips are attached directly to the grille cover.

12. The product of claim 11 wherein the plurality of clips are attached directly to the grille cover via sewing.

13. The product of claim 1 wherein the grille cover has at least one hem seam.

14. The product of claim 13 wherein the plurality of clips are attached to the hem seam.

15. The product of claim 14 wherein the plurality of clips are attached to the hem seam via sewing.

16. The product of claim 13 wherein a plurality of tabs are attached to the hem seam.

17. The product of claim 16 wherein the plurality of tabs are attached to the plurality of clips.

18. The product of claim 17 wherein the plurality of tabs are attached to the plurality of clips via sewing.

* * * * *